United States Patent [19]

Adolfsson

[11] Patent Number: 5,059,039
[45] Date of Patent: Oct. 22, 1991

[54] MAGNETIC BEARING BUSHING
[75] Inventor: Rune Adolfsson, Varberg, Sweden
[73] Assignee: SKF Nova AB, Goteborg, Sweden
[21] Appl. No.: 540,148
[22] Filed: Jun. 19, 1990
[30] Foreign Application Priority Data
Jun. 21, 1989 [SE] Sweden .................................. 8902244
[51] Int. Cl.[5] ......................... F16C 33/10; F16C 27/02
[52] U.S. Cl. .................................... 384/133; 384/114;
384/125; 384/397
[58] Field of Search ................ 384/114, 115, 117, 118,
384/125, 280, 286, 291, 309, 311, 312, 397, 368,
371, 192, 313, 316

[56] References Cited
U.S. PATENT DOCUMENTS
3,746,407  7/1973  Stiles et al. ........................... 384/133
4,694,213  9/1987  Gowda et al. ................... 384/133 X
4,883,367  11/1989  Maruyama ....................... 384/133 X
4,938,611  7/1990  Nii et al. ............................... 384/133

Primary Examiner—Thomas R. Hannon
Attorney, Agent, or Firm—Eugene E. Renz, Jr.

[57] ABSTRACT

A bearing bushing incorporating a sleeve (1) of magnetizable material forming the sliding surface of the bearing, a shaft (2) mounted in said sleeve (1) and a lubricant in the form of a magnetic fluid (3) between the sliding surface of the sleeve (1) and the shaft (2), whereby the sleeve (1) is magnetized in axial direction. For causing a hydrodynamic lubrication and an increased cooling effect the sleeve (1) on the inner side has axial channels (7) and axial recesses (9) on the outer side thus that the magnetic fluid (3) by the axial magnetic field around the sleeve (1), can be given a circulating motion along the inner and outer side of the sleeve.

5 Claims, 2 Drawing Sheets

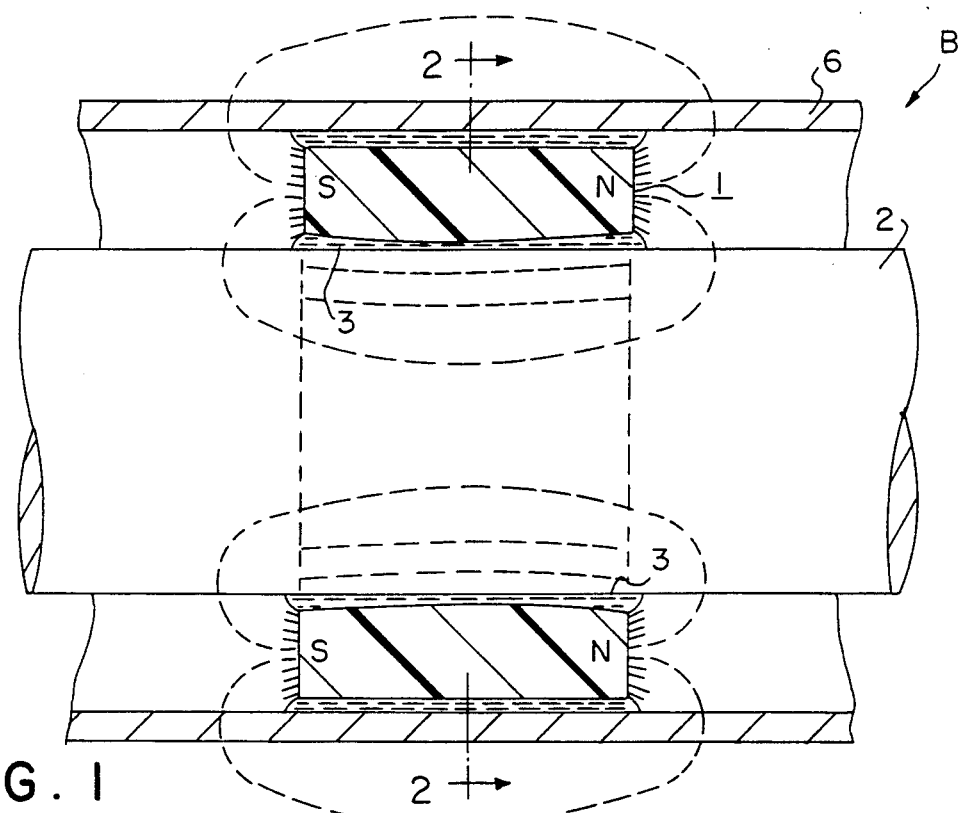
FIG. I
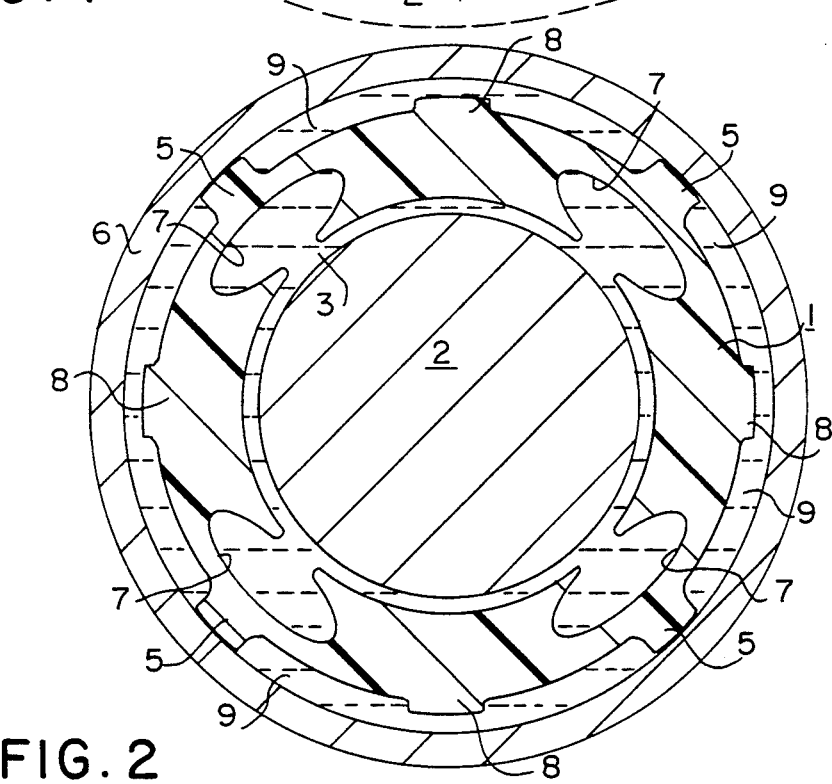
FIG. 2

MAGNETIC BEARING BUSHING

FIELD OF THE INVENTION

The present invention relates to a bearing bushing incorporating a sleeve of magnetizable material forming the sliding surface of the bearing, a shaft mounted in said sleeve and a lubricant in the form of a magnetic fluid between the sliding surface of the sleeve and the shaft, whereby the sleeve is magnetized in an axial direction.

BACKGROUND OF THE INVENTION

Magnetic bearings of the above mentioned type are used in many applications, e.g. at disk storages for computers, in domestic machines. Because of the type we used in these applications to achieve silent operation, extended operation life and high rotational accuracy. An important advantage of such bearings is that the lubricant, which contains particles of magnetizable material, is retained in the bearing by the magnetic field generated by the magnetic bearing sleeve, whereby leakage of the lubricant is prevented.

In DE-A-3.304.623 is shown a magnetic bearing incorporating a magnetic bearing sleeve, which on its surface facing the shaft has grooves for causing a hydrodynamic pressure in the magnetic fluid. This device has a complex design and the shape of the grooves furthermore requires that the shaft is rotated in the sam direction all the time.

SUMMARY OF THE INVENTION

The purpose of the present invention is to provide a bearing of the above type characterized by novel features of construction and arrangement to provide hydrodynamic lubrication, efficient cooling and which is simple and inexpensive to manufacture. This is achieved by providing a sleeve having axial channels on the inner side of the sleeve and recesses in the outer side for circulation of magnetic fluid, which can pass to the outside of the sleeve and through an axial magnetic field around the sleeve. This arrangement produces a circulating motion along the inner and outer side of the sleeve.

BRIEF DESCRIPTION OF THE DRAWINGS

These and other objects of the present invention and the various features and details of the operation and construction thereof are hereinafter more fully set forth with reference to the accompanying drawing, wherein:

FIG. 1 is an axial section through a bearing bushing according to the invention and having a shaft positioned therein.

FIG. 2 is a slightly enlarged sectional view taken on the line 2—2 of FIG. 1.

DETAILED DESCRIPTION OF THE PREFERRED EMBODIMENT

Figure 3:
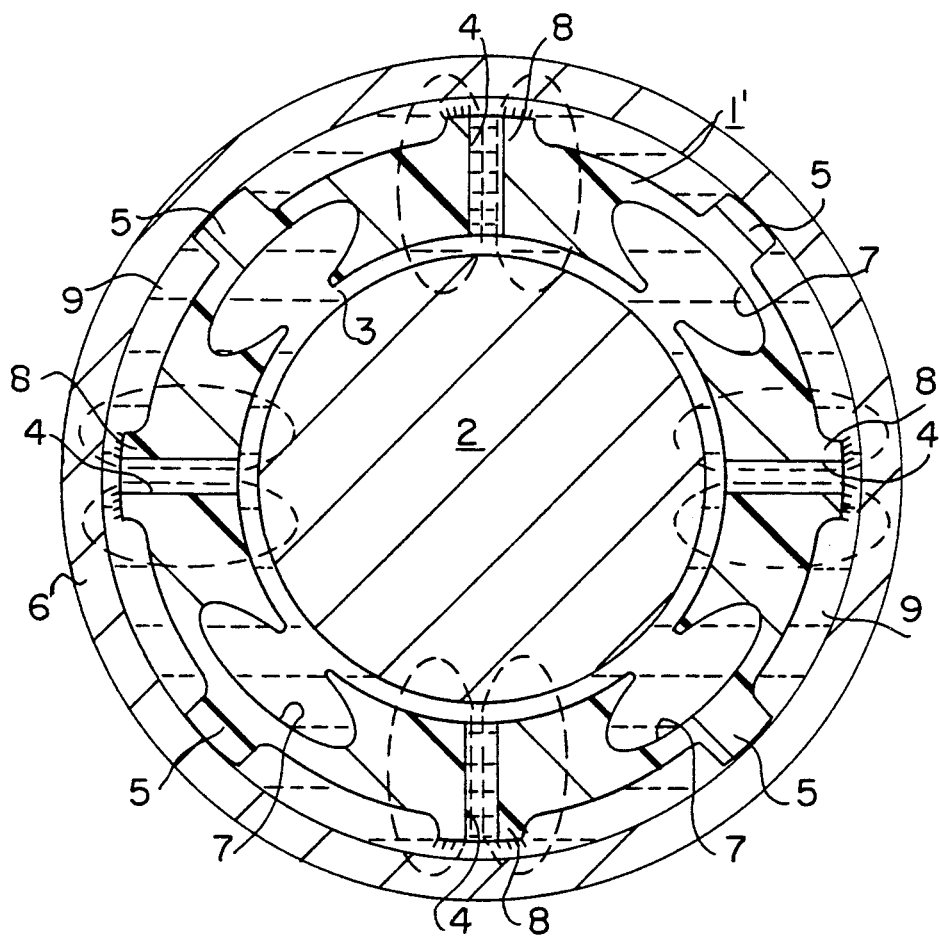
FIG. 3 is a view similar to FIG. 2 but showing an alternative embodiment of the sleeve.

The bearing bushing generally designated B incorporates a sleeve 1 of magnetizable material, preferably a synthetic material, in which have been embedded magnetic particles, e.g. magnetite particles mounted on shaft 2. The shaft 2 may be of a magnetic or non-magnetic material. Between the sleeve 1 and the shaft 2 is introduced a lubricant in the form of a magnetic fluid 3, a so called "ferro-fluid", i.e. a colloidal dispersion or suspension of small magnetic particles in a carrier fluid, e.g. oil. The magnetic particles are retained in stable colloidal suspension by means of a dispersant. Such magnetic fluids can be introduced and retained in spaces without a container by means of a magnetic field.

As can be seen from the drawing, the sleeve 1 on its inner periphery has axial channels 7, which provides a large fluid volume capacity, and therefore produces a good cooling effect. They furthermore act as a reservoir for the magnetic fluid, which gives the bearing a long service life. The channels 7 also serve to attract dirt particles, especially if magnetic poles are provided in the channels.

The sleeve 1 may be magnetized in an axial direction, which means that magnetic fluid 3 is gathered at the end of the sleeve 1 thereby sealing off it. The sleeve 1 furthermore has a number of axial recesses 9. By means of the magnetic field present around the sleeve 1 in the axial direction, a certain circulation of the magnetic fluid will occur, which provides a cooling effect. If the sleeve shall support low loads, it may be provided with holes made therein between the channels 7. This improves the circulation and the cooling effect. The sleeve 1 may also be magnetized in a radial direction, especially around the radial holes 4.

The sleeve 1 as mentioned is manufactured from a synthetic material, e.g. plastics or rubber with embedded magnetite particles or alternatively with an embedded magnetizable steel spring. The advantages with a sleeve of magnetizable plastic material are obvious, it may be manufactured by injection molding and it is possible to give it complex shapes. The sleeve may also be given desired elasticity by means of a proper material choice.

In order to give the bearing a desired rigidity for a clearance-free, stable supporting it may be pre-tensioned. During operation the bearing is however heated and the pretension is altered since both plastics and rubber have higher thermal expansion coefficients than steel, which is the common material for the shaft. In order to prevent that the pre-tension is altered too much, the sliding bearing blocks 1 therefore have been given a suitable geometry, thus that they may flex when needed and it has furthermore been provided ribs or axial ridges 8 on the outer side of the sleeve, which delimit the expansion of the sleeve 1 and the altering of the pretension.

What is claimed is:

1. A bearing bushing incorporating a sleeve (1) of elastic material forming the sliding surface of the bearing, a shaft (2) mounted in said sleeve (1) and a lubricant in the form of a magnetic fluid (3) between the sliding surface of the sleeve (1) and the shaft (2), whereby the sleeve (1) on the inner side has axial channels (7), characterized therein, that the sleeve (1) consists of a magnetized material with recesses (9) on the outer side for circulation of oil and that the lubricant (3) is a magnetic oil.

2. The bearing bushing as claimed in claim 1, characterized therein, that the sleeve (1) is provided with a number of radial holes (4) through which the magnetic fluid (3) can pass to the outer side of the sleeve (1).

3. The bearing bushing as claimed in claim 1 or 2, characterized therein, that the sleeve (1) is magnetized in a axial direction.

4. The bearing bushing as claimed in claim 1 or 2, characterized therein, that the sleeve (1) is magnetized in a radial direction.

5. The bearing bushing as claimed in claim 1, characterized therein, that the sleeve (1) on the outer side is provided with ribs or ridges (8) intended to limit the bearing clearance.

* * * * *